(12) United States Patent
Lelas et al.

(10) Patent No.: US 8,440,230 B2
(45) Date of Patent: May 14, 2013

(54) FORMULATION BASED ON MICRONIZED NATURAL CALCITE MINERAL AS A PLANT BOOSTER AND MINERAL FERTILIZER

(75) Inventors: Antonio Lelas, Zagreb (HR); Ivica Cepanec, Kriz (HR)

(73) Assignee: Mikro Mineral USA, Inc., Cape Coral, FL (US)

( * ) Notice: Subject to any disclaimer, the term of this patent is extended or adjusted under 35 U.S.C. 154(b) by 0 days.

(21) Appl. No.: 13/120,171

(22) PCT Filed: Jan. 29, 2008

(86) PCT No.: PCT/HR2008/000003
§ 371 (c)(1),
(2), (4) Date: Jul. 20, 2011

(87) PCT Pub. No.: WO2009/087426
PCT Pub. Date: Jul. 16, 2009

(65) Prior Publication Data
US 2011/0269627 A1     Nov. 3, 2011

(30) Foreign Application Priority Data

Jan. 11, 2008   (HR) .............................. P 20080015 A

(51) Int. Cl.
| | |
|---|---|
| *A61K 9/14* | (2006.01) |
| *A61K 33/32* | (2006.01) |
| *A61K 33/26* | (2006.01) |
| *A61K 33/22* | (2006.01) |
| *A61K 33/00* | (2006.01) |
| *A01N 59/16* | (2006.01) |
| *A01N 59/14* | (2006.01) |
| *A01N 59/00* | (2006.01) |

(52) U.S. Cl.
USPC ........... 424/489; 424/641; 424/646; 424/648; 424/660; 424/715; 424/724

(58) Field of Classification Search ........................ None
See application file for complete search history.

(56) References Cited

U.S. PATENT DOCUMENTS

| | | | |
|---|---|---|---|
| 4,177,052 A | 12/1979 | Entzmann et al. | |
| 5,228,895 A | 7/1993 | Kelly et al. | |
| 6,706,249 B1 * | 3/2004 | Komatsu et al. | ............. 423/518 |
| 2002/0174697 A1 | 11/2002 | Reid et al. | |
| 2004/0035162 A1 | 2/2004 | Williams et al. | |

FOREIGN PATENT DOCUMENTS

| | | |
|---|---|---|
| DE | 3628611 A1 | 11/1987 |
| DE | 3714444 A1 | 11/1988 |
| EP | 0444392 A2 | 9/1991 |
| EP | 0924176 A1 | 6/1999 |

* cited by examiner

*Primary Examiner* — Alton Pryor
(74) *Attorney, Agent, or Firm* — Winstead PC

(57) ABSTRACT

The present invention is related to a formulation based on micronized natural calcite mineral consisting of: A. mineral part which is characterized: (i) by the particle size with diameter smaller than 5 μm, where the distribution of particle size is such that minimum of 10% of particles are with diameter under 900 nm, with total surface of particles greater than 3.2 $m^2/g$, and with total porous volume greater than 0.012 $cm^3/g$, and by composition: (ii) $CaCO_3$, $MgCO_3$, $FeCO_3$, $MnCO_3$, $ZnCO_3$ and $SiO_2$ in mixtures where $CaCO_3$ is presented in amount from 10% to 99% of mineral part; and B. adjuvant selected from the group consisting of: wetting agent, drift-control agent at application by spraying, humic acid salt, amino-acids salts, complex of plant micro-nutrients, vitamin, plant hormone, nitrogen fertilizer, potassium salt, borate salt, molybdate salt, plant extract, chlorophyll, yeast extract, or mixture of these substances; where A. and B. form an aqueous suspension wherein percentage of A. and B. is lower than 5% by weight. The formulation from this invention is used as a plant booster and mineral fertilizer for stimulation of photosynthetic process in plants, stimulation of plants growth, reinforcement of plant resistance to physiological and anhydrous stress, reinforcement of resistance to different plant diseases, for improvement of nutrient absorption, for increasing crop yields, and for plant nutrition.

15 Claims, 7 Drawing Sheets

Figure 7
 
Figure 8a					Figure 8b

FORMULATION BASED ON MICRONIZED NATURAL CALCITE MINERAL AS A PLANT BOOSTER AND MINERAL FERTILIZER

DESCRIPTION OF THE INVENTION

The Field of the Invention

The present invention relates to a formulation based on micronized natural calcite mineral which is used as a plant booster and mineral fertilizer

SUMMARY OF THE INVENTION

The present invention solves technical problem of producing an improved plant booster and improved mineral fertilizer based on the formulation mainly comprising: micronized natural calcite mineral, which contains variable amounts of calcite, dolomite, ankerite, quartz, and adjuvants according to desired application. The applications of formulation from the present invention result in the following effects: more effective stimulation of photosynthetic process in plants; more efficient stimulation of plant growth; enhanced viability of plants to physiological, particularly to dehydrating stress; increased resistance to various plant diseases, e.g. powdery mildew; improved absorption of plant nutrients; improved plant nutrition and especially increased yields.

DESCRIPTION OF THE PRIOR ART

Although fertilizers are known for several thousands of years, they are intensively employed in a modern sense in last 150 years.

It is known that several factors influence the absorption of nutrients by plants. In the case of proper fertilization, the most important factors are: type of a soil, amounts of water available, and pH value of soil. The deficiencies of nutrients cause different physiological disorders which lead to decreased crop yields, diseases, and other unwanted events.

The most important point for the present invention is the role of calcium (Ca) in plant nutrition [for example see F. Bangerth: Calcium-Related Physiological Disorders of Plants, *Ann. Rev. Phytopathol.* 17 (1979) 97-122].

It is known from the prior art that classical fertilization with lime and/or gypsum is important agrochemical action which is simple and efficient way of correction of pH-value of soil and addition of calcium. However this is not a guarantee that plants will be correctly supplied with calcium. There exist more than 30 disorders caused by deficiency of calcium. These disorders are believed to be due to inefficient distribution rather than poor calcium uptake. Visual symptoms of calcium deficiency in plants are: death of shoots, abnormally deep-green foliage, premature falling of flowers and buds, and weak stalk. The problem of distribution and absorption of calcium in the present invention is solved by completely new and effective manner as it will be demonstrated in detailed description of the invention.

The calcium fertilization known from the prior art includes the use of classical superphosphate (mainly $Ca(H_2PO_4)_2$) or triple superphosphate ($Ca(H_2PO_4)_2$ without gypsum). These superphosphates are employed as standard Ca—P mineral fertilizers, or as starting materials for production of various N—P—K mineral fertilizers as phosphorus component [for example, see U.S. Pat. No. 5,228,895 (Kelly Lime and Rock Company, Inc.) from 1993 or U.S. Pat. No. 4,177,052 (K. Entzmann et al.) from 1979].

Also known is the addition of calcium by using different soil conditioners, such as mixtures of tribomechanically activated (micronized) minerals; like zeolite, calcite, dolomite, magnesite, and others, when applied to the soil in amount of, for example 600 kg/ha, they improve the structure of soil and absorption of basic NPK fertilizers [for example, see European patent published as EP 0 444 392 B1 (T. Loidelsbacher)].

Furthermore, there are known methods of calcium fertilization by irrigation or by foliar application of different calcium mineral fertilizers which are smoothly soluble in water such as calcium salts; $Ca(NO_3)_2$, $CaCl_2$, $Ca(CH_3COO)_2 \cdot xH_2O$, or calcium complexes; $Na_2CaEDTA$, $Ca(LigSO_3)_2$ where Lig=lignin residue. Such products have fast and effective action but cannot insure complete calcium fertilization. In the case of more intensive application, significant losses of these products occur due to washing-off from the foliage by rain. Because of this, an effective additional, foliar calcium fertilization in such a form which is hardly washable from the leaf-surface, but in the same time easily available to the plant, is an important unsolved technical problem. The present invention solves the mentioned problem.

BRIEF DESCRIPTION OF THE DRAWINGS

For a more complete understanding of the present invention and for further objects and advantages thereof, reference may now be had to the following description taken in conjunction with the accompanying drawings in which:

FIG. 7 is a photographic view of a controlled study of treated cucumber leaves;

FIG. 8a is photographic view of untreated wine grape leaves;

FIG. 8b is a photographic view of treated wine grape leaves;

DETAILED DESCRIPTION OF THE INVENTION

Figure 1A:
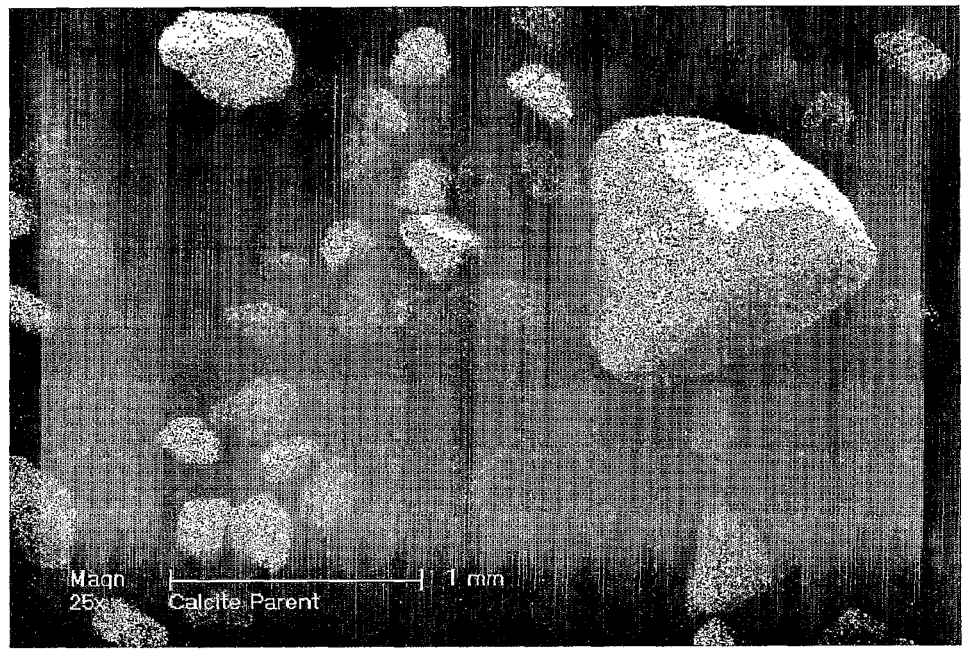
FIG. 1a is a microscopic view (25× magnification) of parent Calcite particles.

The present invention relates to the formulation based on micronized natural calcite mineral containing variable amounts of calcite, dolomite, ankerite, quartz, and adjuvants, which acts as a plant booster and mineral fertilizer.

The natural calcite (calcium carbonate, $CaCO_3$) contains other calcite-related minerals ankerite and dolomite ($Ca(Fe, Mg)CO_3$) and also quartz (silicium dioxide, $SiO_2$), and traces of zinc, manganese, and other essential plant-micronutrients. Such natural calcite is milled in a special mill in order to produce micronized material. Such prepared natural material based on calcite exhibits strong bioactive action at foliar application to various plants where induces reinforcement of growth by stimulation of photosynthesis, improved crop yields, enhanced viability of plants, it feeds plants (with calcium, magnesium, iron, manganese, etc.) and increases efficiency of basic fertilization.

Such double effect of micronized calcite mineral is result of its double action: (i) as a plant booster, and (ii) as a well-balanced Ca, Mg, Fe, Mn, Zn mineral fertilizer.

For growth and development of plants, several nutrients are essential. Major plant nutrients (so called macro-nutrients) are nitrogen (N), phosphorus (P), and potassium (K). The plants take nitrogen in the forms of ammonium cation ($NH_4^+$) nitrate anion ($NO_3^-$), and urea ($H_2NCONH_2$). Phosphorus is absorbed in the form of phosphate anions ($H_2PO_4^-$, $HPO_4^{2-}$), whereas potassium is available as potassium cation ($K^+$).

Secondary nutrients are calcium (as $Ca^{2+}$), magnesium (as $Mg^{2+}$) and sulphur (which is taken by plants in the form of $SO_4^{2-}$ anion). Furthermore, the following micro-nutrients are also essential for plant growth: iron (as $Fe^{2+}$ or $Fe^{3+}$), zinc (as $Zn^{2+}$), manganese (as $Mn^{2+}$), copper (as $Cu^{2+}$), boron (as boric acid, $H_3BO_3$ or its derivatives), chlorine (as $Cl^-$), molybdenum (as molybdate anion, $MoO_4^{2-}$), cobalt (as $Co^{2+}$), and nickel (as $Ni^{2+}$). The latter two micro-nutrients are required in extremely small amounts. Since many soils contain sufficient quantities of cobalt and nickel, these two micro-nutrients are usually avoided in formulations of numerous commercially available mineral fertilizers.

In short, the roles of macro-nutrients N, P, and K in plants are given in Table 1.

TABLE 1

| The element (primary-nutrient) | The role in plant |
|---|---|
| Nitrogen (N): | protein synthesis; formation of chlorophyll; stimulates fast growth |
| Phosphorus (P): | essential for synthesis of DNA and RNA; involved in many biochemical reactions; component of "energy-saving molecules"; adenosine triphosphate (ATP) and related nucleoside polyphosphates; stimulates early growth of root; reinforces maturation; stimulates blossoming, helps germination |
| Potassium (K): | involved in photosynthesis, protein synthesis, activation of enzymes and many biochemical processes; regulates plant stomata and water circulation; controls ionic balance; enhances viability to drought and diseases; increases strength of stalk and straw; improves the quality of grain and germ |

The roles of secondary-nutrients Ca, Mg and S in plants are given in Table 2.

TABLE 2

| The element (secondary-nutrient) | The role in plant |
|---|---|
| Calcium (Ca): | improves formation of root, strength and rigidity of stalk, improves resistance to diseases at seeding |
| Magnesium (Mg): | essential for chlorophyll formation and phosphorus metabolism; helps regulation of uptake of other nutrients |
| Sulphur (S): | key-component of some amino-acids (cysteine, cystine) i vitamins; stimulates germination; contributes to deep-green colour of foliage |

The roles of micro-nutrients Fe, Zn, Mn, Cu, B, Cl, Mo, Co and Ni in plants are shown in Table 3.

TABLE 3

| The element (micro-nutrient) | The role in plant |
|---|---|
| Iron (Fe) | chlorophyll formation |
| Zinc (Zn) | auxins; enzymes |
| Manganese (Mn) | oxidation and reduction reactions in plant cells; reinforces germination and maturation |
| Copper (Cu) | enzymes; light-mediated reactions |
| Boron (B) | helps transport of carbohydrates and cell replication |
| Chlorine ($Cl^-$) | water circulation |
| Molybdenum (Mo) | important in nitrate metabolism; involved in nitrogen fixation |
| Cobalt (Co) | essential for nitrogen fixation |
| Nickel (Ni) | filling up of grain; germ viability |

The present invention involves the formulation based on micronized natural calcite mineral as a plant booster and mineral fertilizer. The formulation consists of micronized calcite mineral and adjuvants which are essential for technical application of the product and/or to achieve enhanced bioactive effect.

The calcite mineral is mined at several locations in Croatia and Bosnia and Herzegovina. Beside calcite phase (calcium carbonate), it contains quartz ($SiO_2$), and calcite-related minerals ankerite and dolomite ($Ca(Fe,Mg)CO_3$. Typical composition of Croatian calcite from Samobor mountain region is:
a) calcite ($CaCO_3$), ankerite and dolomite ($Ca(Fe,Mg)CO_3$)—85%
b) quartz ($SiO_2$)—15%

Preparation and Characterization of Micronized Natural Calcite Mineral

Figure 1B:
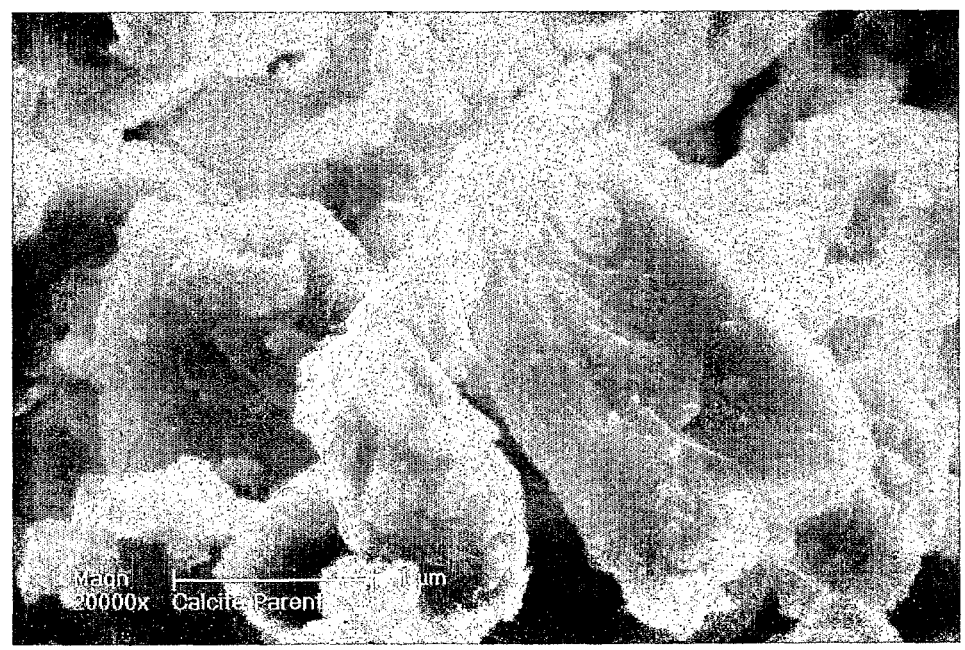
FIG. 1b is a microscopic view (20,000× magnification) of parent Calcite particles.
Figure 2A:
FIG. 2a is a microscopic view (250× magnification) of TMA processed Calcite particles.
Figure 2B:
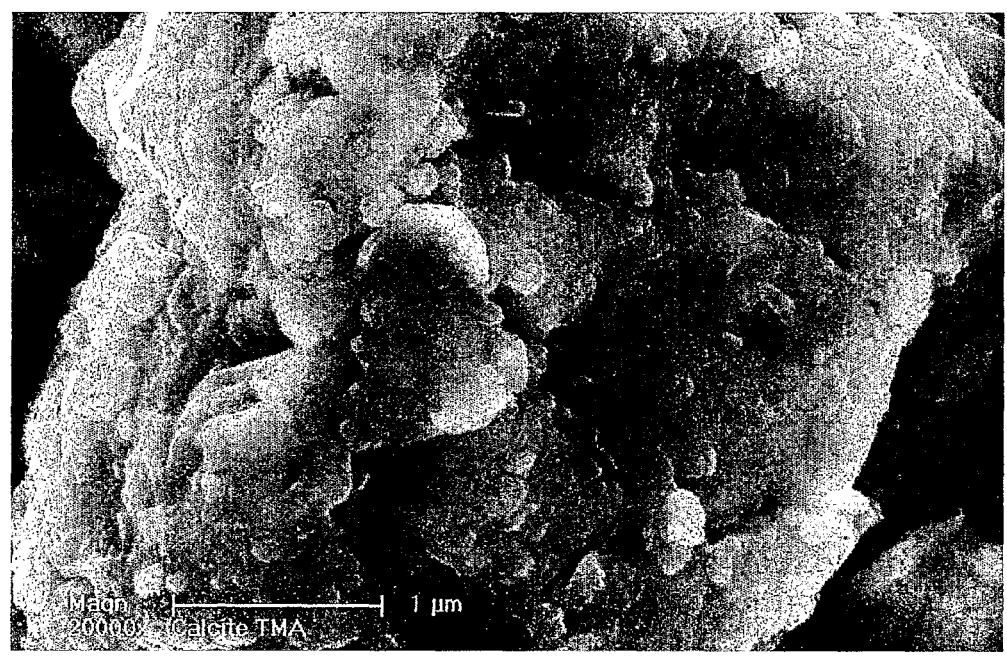
FIG. 2b is a microscopic view (20,000× magnification) of TMA processed Calcite particles.

A sample of natural calcite mined in Croatia (Samobor; 10.00 kg) was subjected to micronization process by using special mill. This mill is consisted of housing with two opposite rotors. Each rotor contains several rings which are installed one between other, which rotate in opposite directions with the same angular speeds. The rings bring several small spades on both sides acting as collision barriers for the material being micronized. The centrifugal forces carry the particles of material from inner to outer rings. The micronization process lasted around 1 h. The product was in the form of almost white powder. Yield: almost 10.00 kg (practically 100%). The product was analyzed by electronic microscopy, atomic absorption spectroscopy, X-ray diffraction, dynamic diffusion of light, and fluorescent X-ray spectroscopy Electronic Microscopy The photographs of samples of starting calcite mineral obtained with electronic microscope at magnification of 25× (a) and 20.000× (b) have shown that the biggest dimensions of particles are between 0.1-1.5 mm (FIGS. 1a and 1b). The surface of these particles is irregular, covered with small particles (smaller than 10 μm) and without any particular geometrical shape. In contrast, the photographs of micronized natural calcite have shown that this material is in the form of aggregate of fine particles whose size is between 1-25 μm (FIGS. 2a and 2b). At high magnification, similar shape of particles could be observed, but with significantly enhanced porosity of particle-surfaces.

Analysis by X-Ray Diffraction

Figure 3:
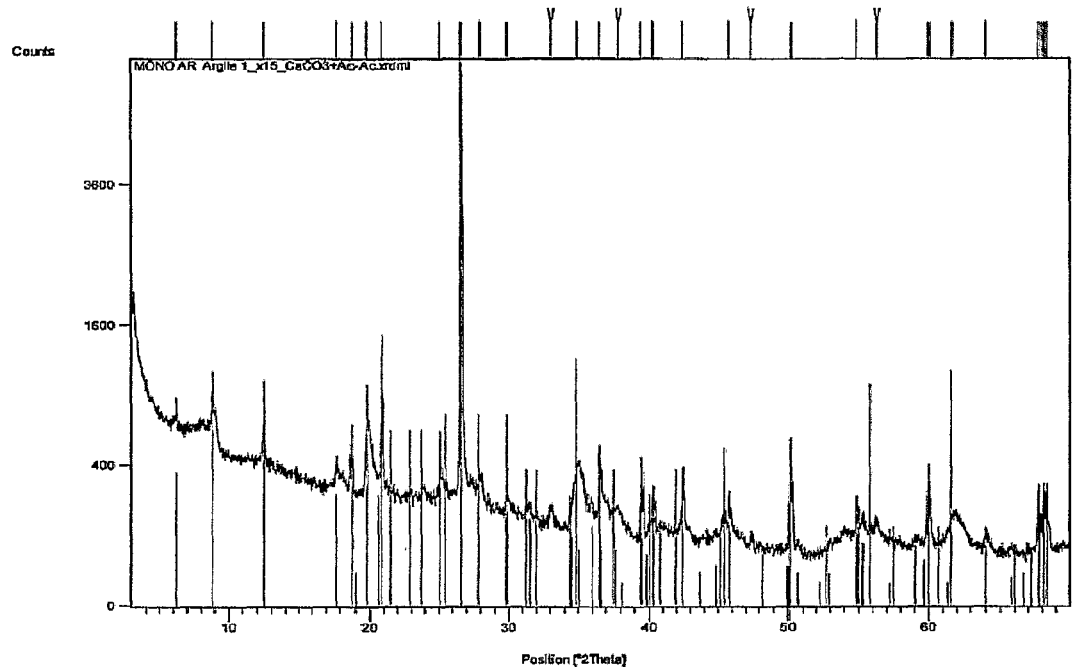
FIG. 3 is an X-Ray diffractogram showing product composition including calcite, ankerite, dolomite, and quartz.

X-Ray diffractogram of the product showed that it is consisting of calcite, ankerite, dolomite, and quartz (FIG. 3).

Figure 4:
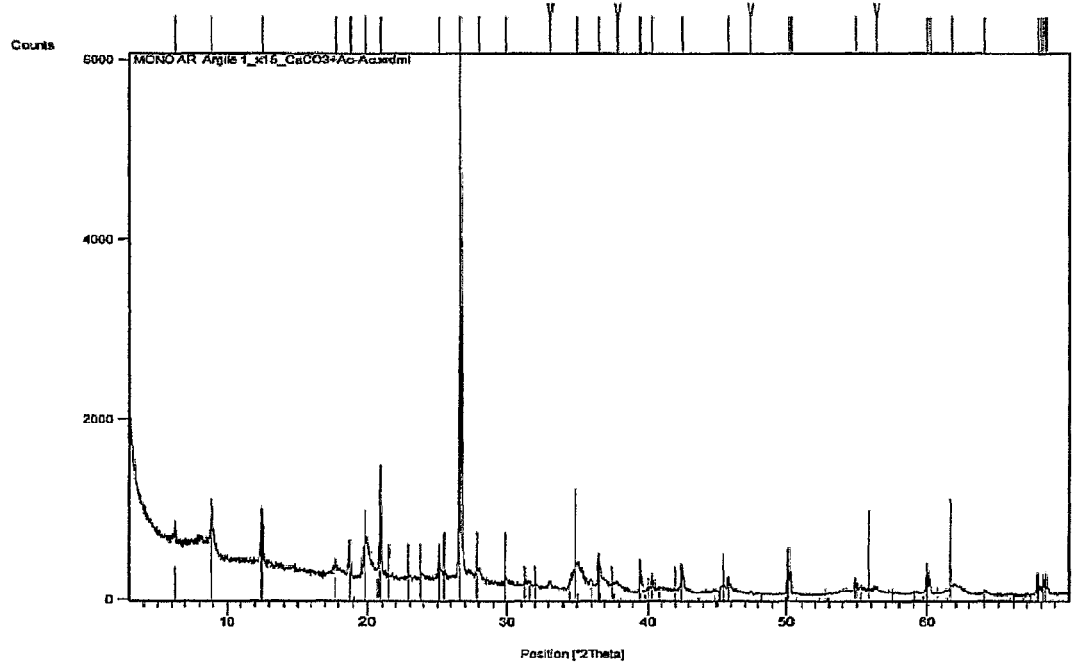
FIG. 4 is an X-Ray analysis showing un-dissolved material including quartz.

Analysis by Simulation of Dissolution of the Mineral Phase in Slightly Acidic Media After dissolution of the product in slightly acidic solution which represents the pH media on the leaf surface (pH~5.8), about 85% of the material was dissolved, whereas 15% of sample remained undissolved. The analysis with X-rays showed that this undissolved material is consisting of quartz ($SiO_2$; FIG. 4).

Measurement of Dinamic Diffusion of Light

The sample of micronized natural calcite (2-3 mg) was suspended in distilled water (20 mL). The suspension was stirred during 20 h. The measurement was conducted at 25° C. by using Zetasizer NanoZS instrument (Malvern instrument), 4 times, every 3 minutes. The detection limit of instrument was between 0.6-6 μm. Total surface: 3.8-4.0 $m^2/g$. Total porous volume: 0.014-0.018 $cm^3/g$. The product showed two types of distribution of particle size. The first one is between 90-140 nm, and the second one is between 350-450 nm. The particle size is mainly under 500 nm (80%), whilst only minor part is by size from 500 nm to 1 μm (20%).

X-Ray Fluorescence Spectroscopy

The analysis showed that the product is containing: 32.4% Ca, 2.16% Mg, 0.76% Fe, 0.015% Mn, 0.003% Zn. The latter nutrients are available after dissolution in slightly acidic media (pH~5.8) which represents the conditions on the plant leaf.

Undissolved residue contains 27.8% Si and 12.5% Al with dominant percentage of oxygen what suggests (beside X-ray diffraction on powdered sample) that these two elements remain in the form of quartz ($SiO_2$) and aluminum oxide ($Al_2O_3$).

Application and Mechanisms of Action

The product can be applied by simple pulverization of leaves and stalk, or by foliar application of suspension of the product (spraying). The formulation from the present invention also includes adjuvant which enhances wetting; then can contain drift-control additive at spray-applications as it is common in the art; then additives which enhance the plant activation such as: humic acid salts, salts of amino-acids, complexes of plant micro-nutrients, vitamins, plant hormones, nitrogen fertilizer, potassium salt, borate salt, molybdate salt, plant extracts, chlorophyll, and yeast extract.

The formulation is produced by homogenization of micronized calcite mineral with one or more adjuvants according to common technological processes known to the person skilled in the art. After homogenization, the product can be granulated, also according to classical procedures [for example see: V. Sauchelli: Chemistry and Technology of Fertilizers, ACS Monograph Series, Reinhold Publication Co., New York, Chapman & Hall Ltd., London, 1960].

It was found that calcite mineral produced by above-described technical procedure has distinct surface properties, different from properties of classically milled calcite. Such calcite mineral exhibits beneficial effects on plants. Such activated surface is obviously capable of activating specific plant mechanisms leading to strong stimulation in a number of tested agricultural crops. Detailed aspects of the action were not completely theoretically clarified, however, several unexpected beneficial effects of micronized calcite mineral in production of various agricultural crops we proved by in vivo experiments.

Several experimental results obtained in experiments with different agricultural crops in comparison with available data from the literature [H. Marschner: Mineral Nutrition of Higher Plants, $2^{nd}$ Edition, Academic Press, London, 1995] strongly suggest that the effect of micronized calcite as a plant booster is a result of its distinct activated surface, rather than because of its calcium content. Such results have not been observed in any of common treatments with different well known foliar calcium mineral fertilizers.

Of course, after some time, micronized calcite mineral, is being dissolved in slightly acidic media on the surface of plant leaf. This process additionally insures the supply of plant with dominantly calcium, but also with other important nutrients which are present in small amounts: magnesium, iron, manganese, zinc, etc. This is the reason why the micronized calcite cannot be considered only as a plant booster, but also as a mineral fertilizer/plant food. The action of micronized calcite as an artificial fertilizer does not begin earlier than the dissolution on the leaf surface occur. This second action of calcite, as mineral fertilizer, was proved by preliminary test where 85% of mineral material was dissolved in slightly acidic solution (pH~5.8) what represents pH conditions on the leaf surface. The residue could not be dissolved in water because it is consisted of quartz ($SiO_2$). It might be speculated that action of such micronized calcite is coming from a presence of freshly generated nano-sized particles of silicium dioxide ($SiO_2$).

Such micronized natural calcite mineral, produced by previously-described process, exhibits profound bioactive properties at foliar application on various plants where allows:

a) reinforcement of plants through highly-stimulated photosynthesis
b) increased crop yields
c) enhanced plant viability including resistance to some plant diseases
d) fertilization with calcium, and magnesium, iron, manganese, zinc, and some other micro-nutrients, and
e) enhancement of efficacy of basic fertilization.

This double action of micronized calcite, as the plant booster and as mineral fertilizer was proved in several controlled studies on various vegetables, fruits, cereals, flowers and ornamentals, turfs, coniferous and leaf forests, etc. For example on: tomato, potato, grape, wheat, barley, lettuce, celery, cucumbers, sugar beet, leek, melon, etc.

The photosynthetic process is strongly enhanced at application with micronized calcite mineral. Using microscope, in treated leaves the following magnifications could be seen:

a) chloroplasts; the photosynthesis is taking part in chloroplasts, that shows the activation of primary metabolism, and
b) small grains of polyphenols and starch; they are chemical products, precursors of secondary metabolism, they have role in natural defense reactions.

Such increasing amounts of starch, polyphenols, and number of chloroplasts, thanks to the treatment with micronized natural calcite mineral lead to increased agricultural crop yields. Moreover, foliar application in different crops caused changes in the structure of waxy layer on the leaf surface. Whole surface is in the contact with water causing strong and persistent hydration, thus allowing minimization and control of stress in the case of water deficiency.

The results of studies in experimental parcels have shown several positive effects in treated cultures, as shown in Table 4.

TABLE 4

| No. | Culture* | Achieved effect |
|---|---|---|
| 1 | Wheat | increased yield (+5.8%), increased strength of stalk |
| 2 | Barley | increased dry matter (+13%) |
| 3 | Potato | increased yield (+3 do 21%), higher homogeneity of tuber size, increased number of tubers, increased dry matter |
| 4 | Sugar beet | increased yield (+7%), increased sugar content (+8%) |
| 5 | Lettuce | increased yield (+5 do 16%), increased dry matter, slightly improved stability during storage |
| 6 | Celery | increased yield (around 10%) |
| 7 | Cucumbers | increased yield (+8 do 13%) |
| 8 | Potato | increased yield (+12 do 15%) |
| 9 | Leek | increased yield (+15.4 do 20.2%), increased resistance to insects and diseases |
| 10 | Melon | increased average number of melons (+12 do 22%) |
| 11 | Grape | increased yield (+7 do 15%), weight of berries, slightly increased sugar content, increased anthocyans, improved colour and resistance of plant to stress |

*Foliar application of micronized natural calcite mineral (1-4 × 1.5-2 kg/ha)

Composition of the Formulation According to the Invention

The formulation of the present invention includes micronized natural calcite mineral and adjuvants where the mineral part is consisting of:
  calcium carbonate phase, from 10% to 99%, most preferably from 50% to 99%,
  magnesium carbonate phase, from 1% to 50%, most preferably from 1% to 25%,
  iron carbonate phase, from 1% to 50%, most preferably from 1% to 25%,
  manganese carbonate phase, from 0.001% to 5%, most preferably from 0.01% to 1%,
  zinc carbonate phase, from 0.001% to 5%, most preferably from 0.01% to 1%,
  silicium dioxide (quartz) phase, from 0.1% to 30%, most preferably from 1% to 5%,
and adjuvant in amounts from 0.0001 to 50% which is selected from the group consisting of:
  wetting agent, most preferably from 2% to 20%,
  drift-control agent at application by spraying, most preferably from 0.5% to 5%,
  humic acid salt, most preferably from 0.1% to 5%,
  salts of amino-acids, most preferably from 0.01% to 10%,
  complex of plant micro-nutrients, most preferably from 0.01% to 50%,
  vitamin, most preferably from 0.001% to 1%,
  plant hormone, most preferably from 0.0001% to 0.1%,
  nitrogen fertilizer, most preferably from 1% to 50%,
  potassium salt, most preferably from 1% to 50%,
  borate salt, most preferably from 0.01% to 50%,
  molybdate salt, most preferably from 0.001% to 0.5%,
  plant extract, chlorophyll, most preferably from 0.1% to 50%,
  yeast extract, most preferably from 0.001 to 5%,
or mixture of two or more above-mentioned adjuvants where overall percentage of adjuvants do not exceed 50% of overall composition of the formulation.

For the reference, see for example V. Mihalić, Opća proizvodnja bilja [*General Crop Production*], Školska knjiga, Zagreb, p. 165-274, 1988.

It is important to mention that given additives do not react chemically with the carbonate-based compounds from the mineral phase, but together form a compatible formulation.

The wetting agent is selected from the group consisting of sodium bis(2-ethylhexyl)sulfosuccinate, potassium bis(2-ethylhexyl)sulfosuccinate, disodium 2-ethylhexylsulfosuccinate, dipotassium 2-ethylhexylsulfosuccinate, polyoxyethylene(2) laurylether, polyoxyethylene(10) laurylether, polyoxyethylene(20) laurylether, polyoxyethylene(2) myristylether, polyoxyethylene(10) myristylether, polyoxyethylene(20) myristylether, polyoxyethylene(2) stearylether, polyoxyethylene(10) stearylether, polyoxyethylene(20) stearylether, polyoxyethylene(2) oleylether, polyoxyethylene(10) oleylether, polyoxyethylene(20) oleylether, polyoxyethylene laurate, polyoxyethylene myristate, polyoxyethylene stearate, polyoxyethylene oleate, polyoxyethylene(20) sorbitan monolaurate, polyoxyethylene sorbitan monopalmitate, polyoxyethylene sorbitan monostearate, polyoxyethylene sorbitan monooleate, polyoxyethylene sorbitan trioleate, polyoxyethylene sorbitan tristearate, polyoxyethylene sorbitan sesquioleate, laurylamide, stearylamide, lauryl monoethanolamide, lauryl diethanolamide, sodium dodecylsulfate, potassium dodecylsulfate, sodium dodecylbenzenesulfonate, potassium dodecylbenzenesulfonate, sodium lauryldiethyleneglycolsulfate, potassium lauryldiethyleneglycolsulfate, sodium lauryltriethyleneglycolsulfate, potassium lauryltriethyleneglycolsulfate, sodium laurate, potassium laurate, ammonium laurate, sodium myristate, potassium myristate, ammonium myristate, sodium palmitate, potassium palmitate, ammonium palmitate, sodium stearate, potassium stearate, ammonium stearate, sodium oleate, potassium oleate, ammonium oleate, sodium ricinoleate, potassium ricinoleate, ammonium ricinoleate, sodium 2-ethylhexanoate, potassium 2-ethylhexanoate, ammonium 2-ethylhexanoate, or their mixtures.

The drift-control agent at application by spraying is selected from the group consisting of polyvinyl alcohol, polyacrylic acid, polyacrylamide, sodium carboxymethylcellulose, methylcellulose, 2-hydroxyethylcellulose, 2-hydroxypropylcellulose, starch, modified starch, sodium starch glycolate, dextrins, modified dextrins, polylactic acid, polyethyleneglycol 400, polyethyleneglycol 600, polyethyleneglycol 1000, polyethyleneglycol 2000, polyethyleneglycol 4000, polyethyleneglycol 6000, polypropyleneglycol, polyglycerol, polyvinylpyrrolidone, guar gum, sodium alginate, agar, carrageenan, pectin, gum arabic, or their mixtures.

Humic acid salts are selected from the group consisting of sodium humate, potassium humate, calcium humate, magnesium humate, iron humate, manganese humate, zinc humate, copper humate, or mixture of two or more mentioned substances.

Salts of amino-acids are selected from the group consisting of sodium, potassium, ammonium, calcium, or magnesium salts of amino-acids: glycine, alanine, valine, leucine, isoleucine, phenylglycine, phenylalanine, methionine, cysteine, cystine, glutamic acid, glutamine, asparaginic acid, asparagine, tyrosine, serine, proline, threonine, lysine, tryptophan, or mixture of two or more mentioned substances.

Complexes of plant micro-nutrients are selected from the group consisting of metal ethylenediaminetetraacetate of general formula $Me_2M(EDTA)$; metal N-(2-hydroxyethyl)ethylenediaminetriacetates of general formula MeM(HEDTA); metal diethylenetriamine-pentaacetates of general formula $MeM_2(DTPA)$; citrate complexes of general formula $MeM(C(OH)(COO)(CH_2COO)_2)$; and lignosulfonates of general formula $Me(Lig-SO_3)_2$; where Me=Na, K, $NH_4$; M=Ca, Mg, Fe, Mn, Zn, Cu;

EDTA=ethylenediaminetetraacetic acid; HEDTA=N-(2-hydroxyethyl)ethylenediaminetriacetic acid; DTPA=diethylenetriamine-pentaacetic acid; and Lig=lignin moiety; or mixture of two or more mentioned complexes.

The vitamins are selected from the group which is consisting of riboflavin, nicotinic acid, nicotinamide, pantothenic acid, pyridoxine, ascorbic acid, biotin, tocoferol, menadione, their sodium, potassium, calcium, magnesium, ammonium salt, or other derivatives which by hydrolysis give starting vitamin, or mixtures of two or more mentioned vitamins.

The plant hormones are selected from the group consisting of 2-(indol-3-yl)acetic acid, 2-(naphthalene-1-yl)acetic acid, 4-(indol-3-yl)butyric acid, abscisic acid, giberelinic acids, in the form of ammonium, sodium, potassium, calcium or magnesium salts, than zeatin, or mixtures of two or more given plant hormones.

The nitrogen fertilizer as adjuvant is selected from the group consisting of urea, ammonium hydrogenphosphate, sodium nitrate, or mixture of these compounds.

Potassium salt as adjuvant is selected from the group consisting of potassium nitrate, potassium hydrogenphosphate, potassium chloride, potassium sulfate, potassium magnesium sulfate, potassium thiosulfate, or mixture of two or more mentioned salts.

Borate salt as adjuvant is selected among classical boron fertilizers such as sodium borate, potassium borate, sodium tetraborate, potassium tetraborate, their hydrates, or mixture of two or more mentioned borate salts.

Molybdate salt was selected from the group consisting of sodium molybdate, potassium molybdate, their hydrates, or their mixtures.

The plant extracts as adjuvant are selected from the group consisting of plant extracts of nettle, wheat, oat, barley, soybean, corn, seaweed, chlorophyll or mixtures of two or more mentioned extracts as inexpensive and readily available, and in the same time rich natural sources of minerals, vitamins, plant hormones, carbohydrates, essential higher fatty acids, amino-acids and proteins which are useful for plants.

EXAMPLES

In following examples, the formulation according to the present invention was employed as suspension in water in concentrations up to 5%. The formulation which was used on experimental fields in examples 1-9 contained 100% of micronized natural calcite mineral, of particle size under 500 nm (80%), in the form of 1% to 2% suspension in water.

Example 1

Figure 5A:
FIG. 5a is a photographic depiction of a leaf of an untreated tomato plant.
Figure 5B:
FIG. 5b is a photographic view of a leaf of a treated tomato plant.

The Use of Micronized Natural Calcite Mineral as a Plant Booster and Mineral Fertilizer in Production of Tomato The controlled study of the action of micronized natural calcite mineral on tomato leaves was performed. The treatment included 3 applications in amounts of 2 kg/ha of micronized natural calcite each 15 days, sprayed in the form of 1% aqueous suspension. The histology study of treated and untreated tomato leaves was conducted. In comparison with untreated plants (FIG. 5a), treated plants showed deep green color indicating an enhanced photosynthesis (FIG. 5b).

Figure 6A:
FIG. 6a is a microscopic view of a leaf of an untreated tomato plant.
Figure 6B:
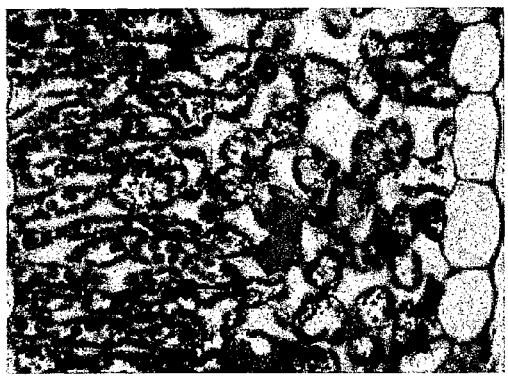
FIG. 6b is a microscopic view of a leaf of a treated tomato plant.

The histology of tomato leaves of treated and untreated plants was studied by optic microscopy after dying of samples. We have found that the number and volume of chloroplasts in the leaves of treated (FIG. 6b) plants are increased, in comparison with those from untreated (FIG. 6a), what also strongly suggests the enhanced photosynthesis.

The reserve of starch particles is significantly bigger than in untreated plants. The metabolism is more active than in treated plants. The presence of many cell nucleuses suggests of enhanced protein synthesis.

Finally, at treated plants significantly increased crop yield in range of 12 to 15% was observed.

Example 2

The Use of Micronized Natural Calcite Mineral as a Plant Booster and Mineral Fertilizer in Production of Cucumbers Micronised natural calcite mineral, obtained by the manner described in detailed description of this invention, was employed as a plant booster and mineral fertilizer in production of cucumbers. Controlled study has shown that foliar treatment of cucumbers with 1% suspension of the product in amounts of 3×1.5 kg/ha enhances intensity of leaves colour (FIG. 7) and weight. Treated plants had longer flowering period, and were less attacked by powdery mildew.

The crop yield at treated plants was increased for 13% in comparison with untreated (control) plants.

Example 3

Figures 9A, 9B:
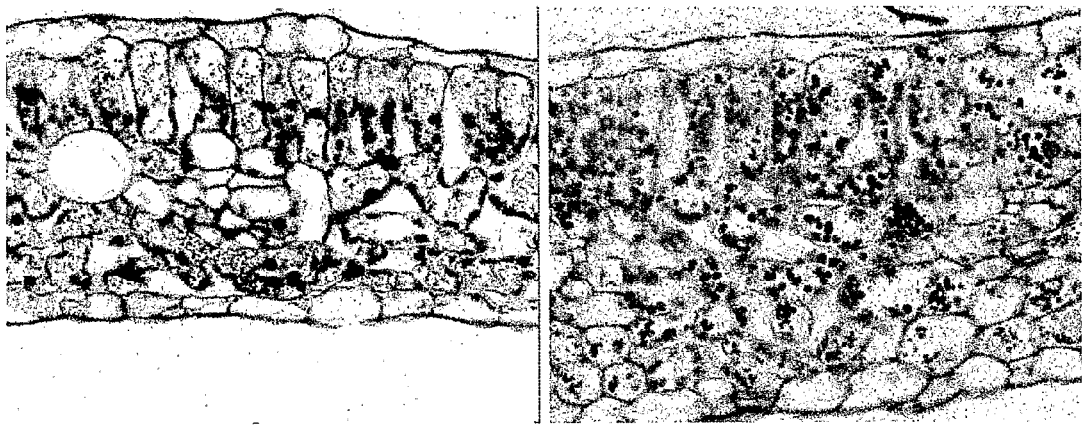
FIG. 9a is a microscopic view of untreated wine grape leaves.
FIG. 9b is a microscopic view of treated wine grape leaves.

The Use of Micronized Natural Calcite Mineral as a Plant Booster and Mineral Fertilizer in Production of Grape Micronized natural calcite mineral was used as a plant booster and mineral fertilizer in production of grape. The grape was sprayed with 2% suspension of micronized natural calcite 3 times, every 15 days in amounts of 2.0 kg/ha. In comparison with leaves of untreated grape (control; FIG. 8a), the leaves of treated grape showed more intensive green color (FIG. 8b). Furthermore additional calcium allows better control of water use. The treated plants were wet on whole surface of the leaves (see FIG. 8b). In contrast, the leaves of untreated plants were only partially covered with drops of water phase (see FIG. 8a). This phenomena occurs because of the fact that micronized natural calcite obviously change the amount of waxy substance on the leaf surface. On the leaves of untreated plants, the layer of waxy substance is thicker (FIG. 9a), whereas on the leaves of treated plants this layer in much thinner (FIG. 9b). The efficient calcium fertilization allows better control of leaves stomata, better usage of water and increased crop yield despite lower amounts of available water.

The controlled studies with varieties Chardonnay, Cabernet Sauvignon and Merlot have shown increased yields between 7 and 15% with improved sugar content, and increased content of anthocyans and poylphenols. During stress (physiological or anhydrous), the grape treated with micronized natural calcite showed better resistance without significant drop of crop yield or quality of berries.

Obviously, as with other plants, micronized natural calcite reinforces the photosynthetic activity in grape what lead to enhanced sugar synthesis.

Example 4

The Use of Micronized Natural Calcite Mineral as a Plant Booster and Mineral Fertilizer in Production of Wheat Micronized natural calcite mineral was employed as a plant booster and mineral fertilizer in production of wheat.

The controlled study has shown that a single foliar treatment of wheat with 2% aqueous suspension in amount of 1.5 kg/ha significantly increased stalk strength. The crop yield was slightly increased, for about 5.8%, in comparison with a yield from the control parcel.

Example 5

The Use of Micronized Natural Calcite Mineral as a Plant Booster and Mineral Fertilizer in Production of Sugar Beet Micronized natural calcite was used as a plant booster and mineral fertilizer in production of sugar beet. The controlled study has shown that a single foliar treatment with 1% aqueous suspension in amount of 1.5 kg/ha led to increased crop yield for a 7%. In the same time, the sugar content in treated sugar beet was increased for 8%.

Example 6

The Use of Micronized Natural Calcite Mineral as a Plant Booster and Mineral Fertilizer in Production of Barley The formulation from this invention was employed as a plant booster and mineral fertilizer in production of barley. Varieties of barley: *Hordeum vulgare, Scarlett* variety (untreated seed). In each pot 25 barley seeds were planted. The pots were placed in a greenhouse. Four days after planting, there were 15 plants in each pot. Micronized natural calcite mineral was applied 3 times by powdering of whole plants. After 4-5 weeks of barley growth, the fresh and dry matter of barley leaves, and weight of roots were measured. The plants were harvested in correct phyto-sanitary state. An average fresh weight of treated plants was the same as of untreated plants, but the dry matter at treated ones was increased for a 13%.

Figures 10A, 10B:
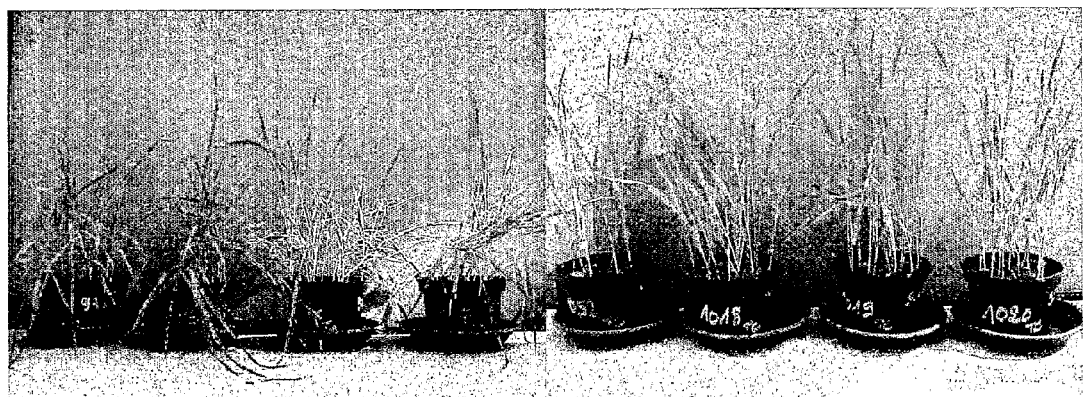
FIG. 10a is photographic view of untreated barley plants.
FIG. 10b is a photographic view of treated barley plants.

According to these results, micronized natural calcite exhibits beneficial effect on the development and condition of barley leaves. The treatment leads to increased dry matter and the index of rhizospheric activity. Beside this, in comparison with untreated plants (FIG. 10a), the outlook of treated plants (FIG. 10b) suggests of much better overall health of treated barley.

Example 7

Figure 11:
FIG. 11 is a photographic view of treated potato.

The Use of Micronized Natural Calcite Mineral as a Plant Booster and Mineral Fertilizer in Production of Potato The formulation from this invention was employed as a plant booster and mineral fertilizer in production of potato. Two treatments with 1% aqueous suspension of the product at amount of 1.5 kg/ha were carried out. The following potato varieties were tested: Ostara, Agatha, Charlotte, and Noirmoutier. The obtained crop yields were increased for 14% (Ostara), 3% (Agatha), 6.5% (Charlotte), and 21% (Noirmoutier). Furthermore, percentage of potato suitable for the market (fraction of tubers with diameter of 30-55 mm) reached 85%. The monosaccharide content in potato tubers was decreased what has a huge impact on the quality of the final product, e.g. Chips. General observation was that the treated potato looks very healthy (FIG. 11).

Final conclusions on the use of micronized natural calcite mineral in production of potato are:

a) increased photosynthetic activity of the plant increases the crop yield,
b) positive indirect effect on fungi diseases and general reinforcement of plant,
c) effect on quality: Increased dry matter and decreased content of monosaccharides which are unwanted for further processing of potato (darkening because of Maillard reaction),
d) increasing hardiness of leaves and cell wall thanks to the treatment with calcite,
e) at all parcels there were significantly increased percentage of tubers acceptable for the market (for 27 to 33%).

Example 8

The Use of Micronized Natural Calcite Mineral as a Plant Booster and Mineral Fertilizer in Production of Lettuce The formulation from this invention was used as a plant booster and mineral fertilizer in production of lettuce, where three treatments with 1% aqueous suspension in amount of 1.5 kg/ha were applied. The following varieties of lettuce were tested: Atria, Oak leaf, Estelle, Loyalle, and Cigale. The crop yields in treated parcels were significantly increased: +12% (Atria), +16% (Oak leaf), +10% (Esttele), +5% (Loyalle), and +12% (Cigale). The stability of lettuce during storage was also significantly improved.

Example 9

Figure 12:
FIG. 12 is a photographic view of treated celery.

The Use of Micronized Natural Calcite Mineral as a Plant Booster and Mineral Fertilizer in Production of Celery The formulation from this invention was used as a plant booster and mineral fertilizer in production of celery. In this study the control parcel was contained of 4×14 plants, the same as treated parcel. The product was applied four times as 2% aqueous suspension. Strong reinforcement of treated plants was observed, what led to increased yield of 10%. Generally, celery from the treated parcels looked very healthy (FIG. 12).

CONCLUSION

From performed examples of the use of formulation which is a special case of general formulation of the present invention based on micronized natural calcite mineral, of following composition:

A. mineral part which is characterized:
  (i) by the particle size with diameter smaller than 5 μm, where the distribution of particle size is such that minimum of 10% of particles are with diameter under 900 nm, with total surface of particles greater than 3.2 m$^2$/g, and with total porous volume greater than 0.012 cm$^3$/g, and by composition:
  (ii) $CaCO_3$, $MgCO_3$, $FeCO_3$, $MnCO_3$, $ZnCO_3$ and $SiO_2$ in mixtures where $CaCO_3$ is presented in amount from 10% to 99% of mineral part; and
B. adjuvant selected from the group consisting of: wetting agent, drift-control agent at application by spraying, humic acid salt, amino-acid salt, complex of plant micro-nutrients, vitamin, plant hormone, nitrogen fertilizer, potassium salt, borate salt, molybdate salt, plant extract, yeast extract, chlorophyll or mixture of these substances;

where A. and B. form the aqueous suspension where percentage of A. and B. is lower than 5% by weight; which was employed as a plant booster and mineral fertilizer in production of tomato, cucumbers, grape, wheat, sugar beet, barley, potato, lettuce, and celery where it was shown that such prepared product allows significantly increased yields of these agricultural crops, which are not expected from prior art by using classical (available) calcium products.

Also, from given examples is clear that the use of any formulation derived from general composition defined above, as well as the case of this special case of the formulation employed in examples 1-9, at similar plant families, species, and varieties also lead to similar technical effect, unexpected increasing of the crop yield.

Furthermore, additional observed effects such as: improved stimulation of photosynthetic process (clearly demonstrated through histological results on examples with tomato, cucumbers and grape), enhanced resistance of plants to physiological stress (see example with grape), enhanced resistance to various plant diseases (example of powdery mildew at cucumbers) and parasites (example of significantly higher resistance to fungi diseases at potato), improved absorption of nutrients (can be seen from crop yields in all examples from 1 to 9) demonstrate utility of basic (simple) form of the formulation. Such properties are not obvious from the prior art by applying calcium compounds on the plants.

Concerning the demonstration of efficacy of the formulation defined by components A. and B. from the first paragraph of the Conclusion, from the prior art [see for example: A. Finck: Dünger and Düngung, VCH Verlagsgesellschaft, Weinheim, Germany, 1992; and also: J. B. Hanson, P. B. Tinker, A. Laćhli: Advances in Plant Nutrition, Vol. 1, Praeger, New York, 1984] it is clear to the person skilled in the art that, according to the needs, to the basic (simple) formulation (which was used in examples of demonstration of efficiency) can be added also early-mentioned adjuvants; wetting agent, drift-control agent at application by spraying, humic acid salt, amino-acids salt, complex of plant micro-nutrients, vitamin, plant hormone, nitrogen fertilizer, potassium salt, borate salt, molybdate salt, plant extract, yeast extract, chlorophyll or mixture of these compounds; in standard effective amounts.

The invention claimed is:

1. A formulation based on a micronized natural calcite mineral, the formulation comprising:
   a mineral part comprising:
   a plurality of particles having a diameter smaller than 5 μm;
   wherein distribution of the plurality of particles is such that the diameter of at least 10% of the plurality of particles is under 900 nm;
   wherein a total surface of the plurality of particles is greater than 3.2 m$^2$/g;
   wherein a total porous volume is greater than 0.012 cm$^3$/g;
   by the composition of the plurality of particles:
   at least one of $CaCO_3$, $MgCO_3$, $FeCO_3$, $MnCO_3$, $ZnCO_3$ and $SiO_2$ in mixtures where $CaCO_3$ is presented in an amount from 10% to 99% of the mineral part;
   an adjuvant comprising at least one of a wetting agent, a drift-control agent, a humic acid salt, an amino-acid salt, a complex of plant micro-nutrients, a vitamin, a plant hormone, a nitrogen fertilizer, a potassium salt, a borate salt, a molybdate salt, a plant extract, a yeast extract, or a chlorophyll;
   wherein the mineral part and the adjuvant form an aqueous suspension where a percentage of the mineral part and the adjuvant is lower than 5% by weight; and
   wherein the wetting agent is present and comprises at least one of sodium bis(2-ethylhexyl) sulfosuccinate, potassium bis(2-ethylhexyl) sulfosuccinate, disodium 2-ethylhexylsulfosuccinate, dipotassium 2-ethylhexylsulfosuccinate, polyoxyethylene (2) laurylether, polyoxyethylene (10) laurylether, polyoxyethylene (20) laurylether, polyoxyethylene (2) myristylether, polyoxyethylene (10) myristylether, polyoxyethylene (20) myristylether, polyoxyethylene (2) stearylether, polyoxyethylene (10) stearylether, polyoxyethylene (20) stearylether, polyoxyethylene (2) oleylether, polyoxyethylene (10) oleylether, polyoxyethylene (20) oleylether, polyoxyethylene laurate, polyoxyethylene myristate, polyoxyethylene stearate, polyoxyethylene oleate, polyoxyethylene (20) sorbitan monolaurate, polyoxyethylene sorbitan monopalmitate, polyoxyethylene sorbitan monostearate, polyoxyethylene sorbitan monooleate, polyoxyethylene sorbitan trioleate, polyoxyethylene sorbitan tristearate, polyoxyethylene sorbitan sesquioleate, laurylamide, stearylamide, lauryl monoethanolamide, lauryl diethanolamide, sodium dodecylsulfate, potassium dodecylsulfate, sodium dodecylbenzenesulfonate, potassium dodecylbenzenesulfonate, sodium lauryldiethyleneglycolsulfate, potassium lauryldiethyleneglycolsulfate, sodium lauryltriethyleneglycolsulfate, potassium lauryltriethyleneglycolsulfate, sodium laurate, potassium laurate, ammonium laurate, sodium myristate, potassium myristate, ammonium myristate, sodium palmitate, potassium palmitate, ammonium palmitate, sodium stearate, potassium stearate, ammonium stearate, sodium oleate, potassium oleate, ammonium oleate, sodium ricinoleate, potassium ricinoleate, ammonium ricinoleate, sodium 2-ethylhexanoate, potassium 2-ethylhexanoate, or ammonium 2-ethylhexanoate.

2. The formulation according to claim 1, wherein:
the adjuvant is the drift control additive; and
the drift control additive comprises at least one of polyvinyl alcohol, polyacrylic acid, polyacrylamide, sodium carboxymethylcellulose, methylcellulose, 2-hydroxyethylcellulose, 2-hydroxypropylcellulose, starch, modified starch, sodium starch glycolate, dextrins, modified dextrins, polylactic acid, polyethyleneglycol 400, polyethyleneglycol 600, polyethyleneglycol 1000, polyethyleneglycol 2000, polyethyleneglycol 4000, polyethyleneglycol 6000, polypropyleneglycol, polyglycerol, polyvinylpyrrolidone, guar gum, sodium alginate, agar, carrageenan, pectin, or gum Arabic.

3. The formulation according to claim 1, wherein:
the adjuvant is the humic acid salt; and
the humic acid salt comprises at least one of sodium humate, potassium humate, calcium humate, magnesium humate, iron humate, manganese humate, zinc humate, or copper humate.

4. The formulation according to claim 1, wherein:
the adjuvant is the amino-acid salt; the amino-acid salt comprises at least one of sodium, potassium, ammonium, calcium, or magnesium; and
the amino-acid salt comprises at least one of glycine, alanine, valine, leucine, isoleucine, phenylglycine, phenylalanine, methionine, cysteine, cystine, glutamic acid, glutamine, asparaginic acid, asparagine, tyrosine, serine, proline, threonine, lysine, or tryptophan.

5. The formulation according to claim 1, wherein:
the adjuvant is the complex of plant micro-nutrients; and
the complex of plant micro-nutrients comprises at least one of metal ethylenediaminetetraacetate of general formula Me₂M(EDTA); metal N-(2-hydroxyethyl)ethylenediaminetriacetates of general formula MeM(HEDTA); metal diethylenetriamine-pentaacetates of general formula MeM₂(DTPA); citrate complexes of general formula MeM(C(OH)(COO)(CH₂COO)₂); or lignosulfonates of general formula Me (Lig-SO₃)₂; where Me=Na, K, NH₄; M=Ca, Mg, Fe, Mn, Zn, Cu; EDTA=ethylenediaminetetraacetic acid; HEDTA=N-(2-hydroxyethyl)ethylenediaminetriacetic acid; DTPA=diethylenetriamine-pentaacetic acid; and Lig=lignin residue.

6. The formulation according to claim 1, wherein:
the adjuvant is the vitamin; and
the vitamin comprises at least one of riboflavin, nicotinic acid, nicotinamide, pantothenic acid, pyridoxine, ascorbic acid, biotin, tocoferol, or menadione.

7. The formulation according to claim 1, wherein:
the adjuvant is the plant hormone; and
the plant hormone comprises at least one of 2-(indol-3-yl) acetic acid, 2-(naphthalene-1-yl)acetic acid, 4-(indol-3-yl) butyric acid, abscisic acid, or giberelinic acids.

8. The formulation according to claim 1, wherein:
the adjuvant is the nitrogen fertilizer; and
the nitrogen fertilizer comprises at least one of urea, ammonium hydrogenphosphate, or sodium nitrate.

9. The formulation according to claim 1, wherein:
the adjuvant is the potassium salt; and
wherein the potassium salt comprises at least one of potassium nitrate, potassium hydrogenphosphate, potassium chloride, potassium sulfate, potassium magnesium sulfate, or potassium thiosulfate.

10. The formulation according to claim 1, wherein:
the adjuvant is the borate salt; and
the borate salt comprises at least one of sodium borate, potassium borate, sodium tetraborate, potassium tetraborate, or hydrates of sodium borate, potassium borate, sodium tetraborate, or potassium tetraborate.

11. The formulation according to claim 1, wherein:
the adjuvant is the molybdate salt; and
the molybdate salt comprises at least one of sodium molybdate, potassium molybdate, or hydrates of sodium molybdate or potassium molybdate.

12. The formulation according to claim 1, wherein:
the adjuvant is the plant extract; and
the plant extract acts as a source of minerals, vitamins, plant hormones, carbohydrates, fatty acids, amino-acids, and proteins.

13. The formulation according to claim 1, wherein:
the adjuvant is the plant extract; and
the plant extract comprises at least one of nettle, wheat, oat, barley, corn, seaweed, or chlorophyll.

14. The formulation according to claim 1, wherein the formulation is used as a plant booster and a mineral fertilizer for stimulation of a photosynthetic process in plants, stimulation of plant growth, reinforcement of plant resistance to physiological and anhydrous stress, reinforcement of resistance to plant diseases, improvement of nutrient absorption, and plant nutrition.

15. The formulation according to claim 1, wherein the formulation is effective as a plant booster and a mineral fertilizer for treatment of vegetables, fruits, grape, flowers and ornamentals, cereals, turfs, and forests.

* * * * *

UNITED STATES PATENT AND TRADEMARK OFFICE
CERTIFICATE OF CORRECTION

PATENT NO. : 8,440,230 B2  Page 1 of 1
APPLICATION NO. : 13/120171
DATED : May 14, 2013
INVENTOR(S) : Lelas et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 344 days.

Signed and Sealed this
Eighth Day of September, 2015

Michelle K. Lee
*Director of the United States Patent and Trademark Office*